(12) United States Patent
Miura et al.

(10) Patent No.: US 11,187,608 B2
(45) Date of Patent: *Nov. 30, 2021

(54) UNBALANCE DETECTION DEVICE, AND UNBALANCE DETECTION METHOD

(71) Applicant: MITSUBISHI HEAVY INDUSTRIES ENGINE & TURBOCHARGER, LTD., Sagamihara (JP)

(72) Inventors: Shuichi Miura, Tokyo (JP); Takuya Arakawa, Tokyo (JP); Yosuke Dammoto, Tokyo (JP); Shota Yoshikawa, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 154 days.

This patent is subject to a terminal disclaimer.

(21) Appl. No.: 16/302,232

(22) PCT Filed: May 26, 2016

(86) PCT No.: PCT/JP2016/065544
§ 371 (c)(1),
(2) Date: Nov. 16, 2018

(87) PCT Pub. No.: WO2017/203649
PCT Pub. Date: Nov. 30, 2017

(65) Prior Publication Data
US 2019/0212220 A1 Jul. 11, 2019

(51) Int. Cl.
*G01M 1/16* (2006.01)
*G01H 1/00* (2006.01)
(Continued)

(52) U.S. Cl.
CPC .............. *G01M 1/16* (2013.01); *G01H 1/006* (2013.01); *G01H 11/00* (2013.01); *G01M 1/02* (2013.01)

(58) Field of Classification Search
CPC ...... G01H 1/00–006; G01M 1/00–365; G01M 15/14
See application file for complete search history.

(56) References Cited

U.S. PATENT DOCUMENTS

| | | |
|---|---|---|
| 2,874,008 A | 2/1959 | Orte et al. |
| 4,325,259 A | 4/1982 | Willertz |

(Continued)

FOREIGN PATENT DOCUMENTS

| | | |
|---|---|---|
| CN | 1109147 A | 9/1995 |
| CN | 1353247 A | 6/2002 |

(Continued)

OTHER PUBLICATIONS

Techtips—Anatomy of a Turbocharger: What's Inside and How it Works. (Feb. 3, 2015). Retrieved Jun. 12, 2020, from https://www.cartechbooks.com/techtips/anatomy-of-a-turbocharger-whats-inside-and-how-it-works (Year: 2015).*

(Continued)

*Primary Examiner* — Alexander A Mercado
(74) *Attorney, Agent, or Firm* — Birch, Stewart, Kolasch & Birch, LLP

(57) ABSTRACT

An unbalance detection device for detecting unbalance of a rotor of a turbo-cartridge which includes the rotor including a turbine wheel and a compressor wheel coupled via a rotational shaft and a bearing housing accommodating a bearing which supports the rotor rotatably, includes: a sound pressure sensor capable of detecting vibration upon rotation of the rotor by contactlessly measuring a sound pressure generated from vibration upon rotation of the rotor.

12 Claims, 6 Drawing Sheets

(51) Int. Cl.
*G01M 1/02* (2006.01)
*G01H 11/00* (2006.01)

(56) References Cited

U.S. PATENT DOCUMENTS

| | | | |
|---|---|---|---|
| 4,694,689 A * | 9/1987 | Kawasaki | G01M 1/04 |
| | | | 73/114.77 |
| 4,864,859 A * | 9/1989 | Jensen | G01M 1/22 |
| | | | 73/473 |
| 4,900,165 A | 2/1990 | Kun et al. | |
| 5,197,010 A * | 3/1993 | Andersson | G01M 1/22 |
| | | | 464/180 |
| 6,474,166 B1 | 11/2002 | Osawa et al. | |
| 9,181,804 B1 * | 11/2015 | Kennedy | B23P 19/04 |
| 10,119,419 B2 | 11/2018 | Walter et al. | |
| 2001/0027688 A1 * | 10/2001 | Yamanaka | G01H 1/00 |
| | | | 73/865.6 |
| 2002/0054821 A1 | 5/2002 | Takeuchi et al. | |
| 2006/0107744 A1 | 5/2006 | Li et al. | |
| 2008/0047344 A1 * | 2/2008 | Gutknecht | F04D 29/0563 |
| | | | 73/462 |
| 2008/0289416 A1 * | 11/2008 | Thelen | G01M 1/04 |
| | | | 73/471 |
| 2010/0191380 A1 * | 7/2010 | Maeda | G01M 1/36 |
| | | | 700/280 |
| 2010/0269588 A1 * | 10/2010 | Thelen | G01M 1/04 |
| | | | 73/460 |
| 2014/0007663 A1 * | 1/2014 | Berger | G01M 15/09 |
| | | | 73/112.05 |
| 2014/0200837 A1 * | 7/2014 | Blair | G01N 29/222 |
| | | | 702/48 |
| 2015/0185089 A1 * | 7/2015 | DeSilva | F02C 9/00 |
| | | | 73/112.01 |
| 2015/0198216 A1 | 7/2015 | Koyama et al. | |
| 2015/0361993 A1 * | 12/2015 | An | F04D 29/662 |
| | | | 416/61 |
| 2016/0016316 A1 * | 1/2016 | Fowler | B25J 9/0084 |
| | | | 700/213 |
| 2016/0102554 A1 * | 4/2016 | Cornell | B23P 6/002 |
| | | | 416/223 A |
| 2016/0201611 A1 * | 7/2016 | Bizub | F02P 5/04 |
| | | | 123/568.11 |
| 2016/0223496 A1 * | 8/2016 | Klos | G01H 1/003 |
| 2017/0138811 A1 * | 5/2017 | Inoue | G01M 1/18 |
| 2018/0348303 A1 * | 12/2018 | Unnikrishnan | F03D 17/00 |
| 2019/0162622 A1 * | 5/2019 | Miura | F16F 15/04 |
| 2019/0301359 A1 * | 10/2019 | Yamashita | F01D 25/285 |

FOREIGN PATENT DOCUMENTS

| | | |
|---|---|---|
| CN | 101305272 A | 11/2008 |
| CN | 101688816 A | 3/2010 |
| CN | 204239602 U | 4/2015 |
| CN | 104776140 A | 7/2015 |
| CN | 104895807 A | 9/2015 |
| DE | 10 2007 058 592 A1 | 6/2009 |
| DE | 10 2008 025 906 A1 | 12/2009 |
| EP | 0 355 656 B1 | 2/1994 |
| EP | 1867850 A1 | 12/2007 |
| EP | 2 172 758 A1 | 4/2010 |
| EP | 2581553 A1 | 4/2013 |
| EP | 2 960 465 A1 | 12/2015 |
| JP | 61-265533 A | 11/1986 |
| JP | 62-135743 A | 6/1987 |
| JP | 3-503315 A | 7/1991 |
| JP | 4-103234 U | 9/1992 |
| JP | 7-18746 B2 | 3/1995 |
| JP | 2001-74547 A | 3/2001 |
| JP | 2003-240054 A | 8/2003 |
| JP | 2004-278580 A | 10/2004 |
| JP | 3835501 B2 | 10/2006 |
| JP | 4232841 B2 | 3/2009 |
| JP | 4236510 B2 | 3/2009 |
| JP | 2011-106845 A | 6/2011 |
| JP | 2013-508599 A | 3/2013 |
| JP | 2014-215160 A | 11/2014 |
| KR | 10-2007-0056700 A | 6/2007 |
| WO | WO 2015/198487 A1 | 12/2015 |

OTHER PUBLICATIONS

English Translation of EP 2581553 (Year: 2013).*
Office Action dated Aug. 13, 2019 issued in the corresponding Japanese Application No. 2018-518880.
Office Action dated Sep. 19, 2019 issued in the corresponding European Application No. 16903131.7.
Extended European Search Report effective Apr. 25, 2019 issued in the corresponding European Application No. 16903131.7.
International Preliminary Report on Patentability and Written Opinion of the International Searching Authority (forms PCT/IB/373, PCT/ISA/237, PCT/IB/326 and PCT/IB/338), dated Dec. 6, 2018, for International Application No. PCT/JP2016/065544, with translation of the Written Opinion.
International Search Report (forms PCT/ISA/210 and PCT/ISA/220), dated Jul. 26, 2016, for International Application No. PCT/JP2016/065544.
Chinese Office Action and Search Report dated Jun. 2, 2020, for counterpart Chinese Application No. 201680085938.5, with partial translation.
Chinese Office Action and Search Report dated Mar. 3, 2020 issued to the corresponding Chinese Application No. 201780045199.1, with partial translation.
Extended European Search Report dated Oct. 28, 2019 issued in the corresponding European Application No. 17877700.9.
International Preliminary Report on Patentability and Written Opinion of the International Searching Authority (forms PCT/IB/373, PCT/ISA/237, PCT/IB/326 and PCT/IB/338), dated Dec. 6, 2018, for International Application No. PCT/JP2016/065543, with translation of the Written Opinion.
International Search Report (forms PCT/ISA/210 and PCT/ISA/220), dated Jul. 26, 2016, for International Application No. PCT/JP2016/065543.
International Search Report (PCT/ISA/210) issued in PCT/JP2017/043187, dated Mar. 6, 2018.
Japanese Office Action for Japanese Application No. 2016-237649, dated May 26, 2020, with English Machine translation.
Partial Supplementary European Search Report dated Jul. 22, 2019 in the corresponding European Application No. 17877700.9.
U.S. Office Action dated Jun. 19, 2020, for U.S. Appl. No. 16/303,058.
Written Opinion (PCT/ISA/237) issued in PCT/JP2017/043187, dated Mar. 6, 2018.
European Office Action effective Mar. 9, 2020 issued to the European Application No. 16903130.9.
Extended European Search Report effective Jun. 7, 2019 issued to the European Application No. 16903130.9.
Japanese Office Action for Japanese Application No. 2018-518879, dated Aug. 6, 2019, with English translation.
Supplementary European Search Report dated Apr. 25, 2019 issued in the European Application No. 16903131.7.
Office Action dated Jul. 3, 2020 issued in relevant Chinese Application No. 201680085941.7 with Machine Translation.
Chinese Office Action and Search Report dated Oct. 14, 2020 for Application No. 201780045199.1 with an English translation of the Office Action.

* cited by examiner

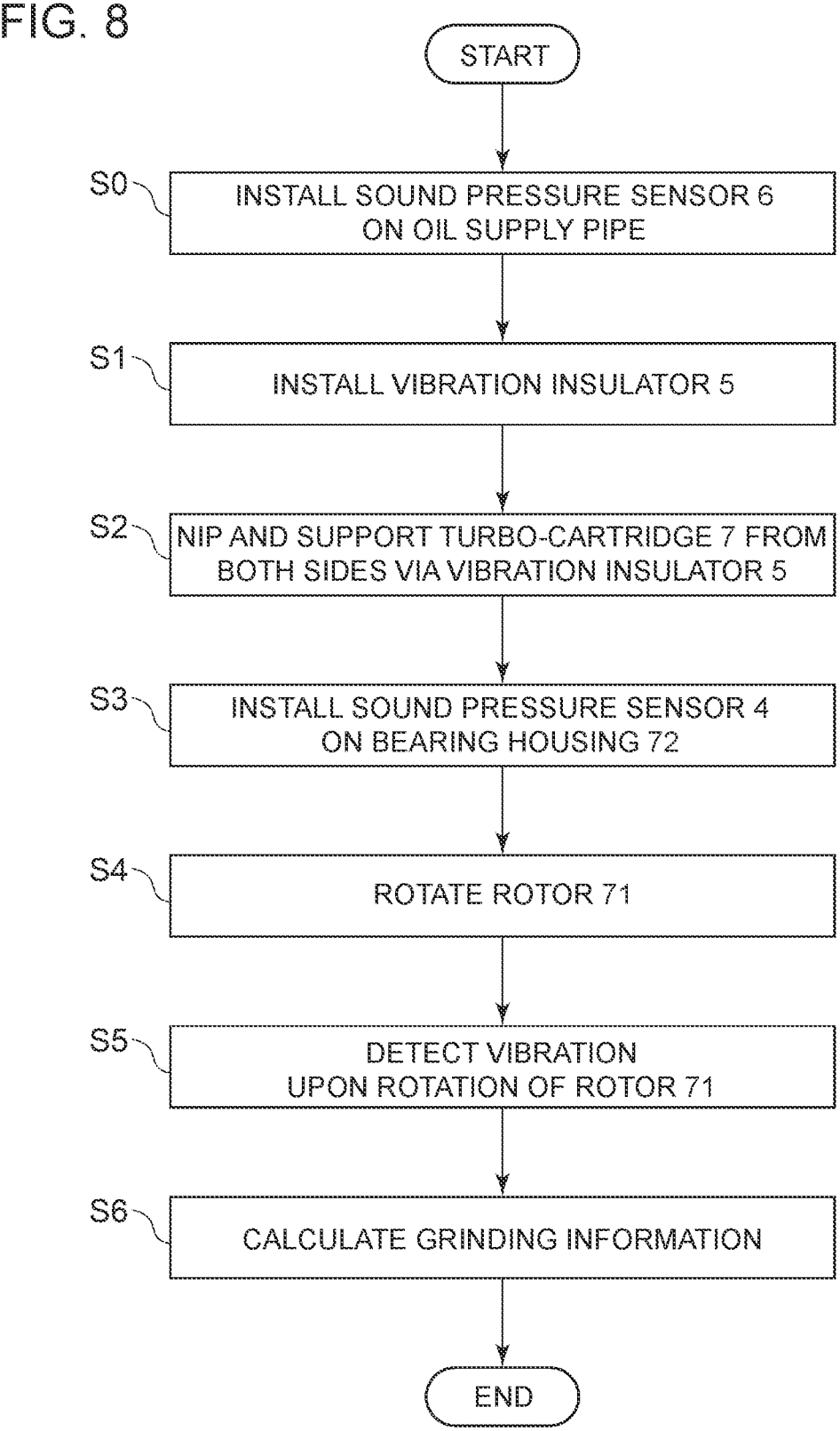

UNBALANCE DETECTION DEVICE, AND UNBALANCE DETECTION METHOD

TECHNICAL FIELD

The present disclosure relates to an unbalance detection device and an unbalance detection method for detecting unbalance of a rotor in a turbo-cartridge including: a rotor coupling a turbine wheel and a compressor wheel via a rotational shaft; and a bearing housing which accommodates a bearing rotatably supporting the rotor.

BACKGROUND ART

For a cartridge, which is a core component of a turbo-charger (hereinafter, turbo-cartridge), balancing of a rotor forming the turbo-cartridge is performed after assembling the turbo-cartridge (see Patent Documents 1 to 4, for instance). This balancing work includes unbalance detection of detecting unbalance of a rotor while the rotor is in rotation, and is a series of works including slightly grinding a part of the rotor to balance the rotor, for instance, if unbalance of the rotor is detected. More specifically, while a turbo-cartridge is supported (fixed) with an unbalance detection device, air is supplied to a compressor wheel to create a state where the rotor is rotating, and vibration upon rotation due to unbalance of the rotor is detected with an acceleration sensor (vibration sensor). The phase of the rotor that causes vibration is determined on the basis of a relationship between the vibration signal detected with the acceleration sensor and the phase of the rotor detected simultaneously with the vibration signal. Then, the rotor is ground for balancing, where the relationship between the mass to be ground (unit weight) and a change in the magnitude of vibration accompanying the grinding (effect vector) are obtained in advance through experiments by using a turbo-cartridge of the same model (production). Further, on the basis of the above vibration signal, phase, and effect vector (experiment result), grinding information that includes the optimum mass (weight) and position for balancing the rotor is calculated, and the rotor is ground on the basis of the grinding information.

Meanwhile, the unbalance detection device uses two housing members to accommodate a turbine wheel or a compressor wheel of a rotor, respectively, and supports the bearing housing directly from both sides (see Patent Document 3). At this time, in Patent Document 3, the respective housing members of the turbine-wheel side and the compressor-wheel side are fixed to each other with bolts via a fixing rod. In this bolt-fixing method, the bolt-fastening work is required every time the work-target turbo-cartridge is mounted to the unbalance detection device, which leads to deterioration of the productivity. Thus, Patent Document 4 discloses an unbalance correction device capable of supporting one side of a turbo-cartridge by a clamping method of supporting without fixing with bolts, and reducing the influence of resonance due to coincidence of the unique frequency of the unbalance detection device side and the rotation frequency of the rotor accompanying rotation of the rotor, and improving the accuracy regarding the unbalance correction.

Furthermore, in Patent Documents 3 and 4 describe above, when the turbo-cartridge is supported by the clamping method, the housing member and the bearing housing of the turbo-cartridge are in direct contact. Thus, vibration upon rotation of the rotor is transmitted appropriately to the housing member, via the bearing housing of the bearing supporting the rotor. Thus, the acceleration sensor (vibration sensor) for detecting vibration upon rotation of the rotor is disposed not on the turbo-cartridge side, but on the housing member of the unbalance detection device. With this configuration, it is unnecessary to provide an acceleration sensor for each cartridge every time each of manufactured turbo cartridges is provided for an unbalance detection device, which makes it possible to improve the efficiency of the sensor installation work in the balancing work and detect vibration of the rotor efficiently.

CITATION LIST

Patent Literature

Patent Document 1: JP2003-240054A
Patent Document 2: JPS62-135743A
Patent Document 3: JPH3-503315A
Patent Document 4: JP4232841B

SUMMARY

Problems to be Solved

As disclosed in Patent Document 4 described above, it is more advantageous to support the turbo-cartridge by the clamping method than the bolt-fixing method, in terms of productivity. In the bolt-fixing method, the bolts need to be fastened or detached, which increases the work time and costs. Thus, it is particularly suitable to support mass-produced turbo-cartridges by the clamping method. However, in a case where the housing member and the bearing housing of the turbo-cartridge are in direct contact in the clamping method as in Patent Document 4, the following problem may arise. That is, in the clamping method, the cartridge is not fixed firmly with bolts, and thus the stability in supporting the turbo-cartridge is not as high as the bolt-fixing method. Thus, the different manners of contact between the bearing housing and the housing member (how the bearing housing and the housing member contact directly) at the time when the turbo-cartridge is supported by the unbalance detection device may affect the vibration property upon rotation of the rotor significantly, such as a change in the resonance point of resonance between the turbo-cartridge and the device described above.

For instance, the above described effect vector is obtained in a state where the bearing housing of the turbo-cartridge and the housing member are in a stably-supported state, such as being fixed with bolts. Thus, if the vibration property changes depending on the manner of contact between the members, the correspondence relationship between the cartridge under the balancing work and the effect vector may become inappropriate, which makes it difficult to calculate the grinding information accurately, and also leads to deterioration of yielding such as resulting in defective products. Furthermore, if it is necessary to perform a work for re-doing the support (installation) of the turbo-cartridge to the unbalance detection device (re-clamping) to achieve an appropriate correspondence relationship with the effect vector, it leads to deterioration of the productivity of the turbo-cartridge. Furthermore, it is necessary to detach the housing member from the turbo-cartridge to grind the rotor, and in a case it is necessary to check the vibration property after grinding, if the manner of contact after re-clamping is different from the previous one, the vibration property also changes, which may lead to deterioration of the work efficiency of the balancing work.

Furthermore, as described in Patent Documents 3 and 4, in order to install an acceleration sensor, which is a contact-type sensor, on a housing member of the unbalance detection device, it is necessary to transmit vibration upon rotation of the rotor appropriately to the housing member. However, in the clamp method, detection is affected by resonance depending on the above described manner of contact between the bearing housing and the housing member, and thus it may be difficult to detect the vibration signal from the rotor appropriately. At this time, a non-contact type vibration sensor could be employed, such as eddy-current type sensors, capacitance sensors, optical sensors, and ultrasonic sensors. However, such non-contact type vibration sensors do not have a sufficient resolution for detecting vibration upon rotation of the rotor, and it is difficult to detect the vibration signal from the rotor appropriately. In this regard, the present inventors found that it is possible to detect the vibration signal of the rotor appropriately with a necessary resolution, by using a sound pressure sensor used to detect sounds.

In view of the above issue, an object of at least one embodiment of the present invention is to provide an unbalance detection device which detects vibration upon rotation of the rotor of the turbo-cartridge with a sound pressure sensor.

Solution to the Problems (1) According to at least one embodiment of the present invention, an unbalance detection device for detecting unbalance of a rotor of a turbo-cartridge which includes the rotor including a turbine wheel and a compressor wheel coupled via a rotational shaft and a bearing housing accommodating a bearing which supports the rotor rotatably, includes: a sound pressure sensor capable of detecting vibration upon rotation of the rotor by contactlessly measuring a sound pressure generated from vibration upon rotation of the rotor.

With the above configuration (1), the unbalance detection device is configured to detect vibration upon rotation of the rotor, by utilizing a sound pressure sensor for detecting the sound pressure (sound) such as a microphone. The vibration upon rotation of the rotor cannot be detected appropriately with the resolution of non-contact type sensors, but can be detected with the resolution of the sound pressure sensor as described below. Accordingly, it is possible to detect vibration upon rotation of the rotor by using the sound pressure sensor. Further, in a case where the turbo-cartridge is supported by the clamp method via a vibration insulator as described below, the non-contact type sound pressure sensor can be installed without requiring attaching and removing work for each mass-produced turbo-cartridge. Accordingly, it is possible to improve the efficiency of the unbalance detection work by detecting vibration upon rotation of the rotor by using the sound pressure sensor.

(2) In some embodiments, in the above configuration (1), the sound pressure sensor includes a microphone having a directional characteristic capable of picking a sound pressure from a specific direction, or the sound pressure sensor is configured to measure a sound pressure from the specific direction on the basis of respective sound pressures picked by a plurality of microphones.

With the above configuration (2), the sound pressure sensor is configured to measure the sound pressure coming in from a specific direction. For instance, a microphone having no directional characteristics would pick up sound pressures other than that of a target object, but such sound pressures are disturbance in the vibration detection of the rotor. Thus, by using a microphone having directional characteristics, or by performing signal processing on the sound pressure from a plurality of microphones, it is possible to measure the sound pressure only in a specific direction. Accordingly, it is possible to enhance the detection accuracy of vibration upon rotation of the rotor, by measuring only the sound pressure coming in from the bearing housing of the turbo-cartridge.

(3) In some embodiments, in the above configuration (1) or (2), the sound pressure sensor has a self-noise level of 50 dB or less.

With the above configuration (3), it is possible to detect vibration upon rotation of the rotor by using the sound pressure sensor with a necessary resolution.

(4) In some embodiments, in the above configuration (2), the unbalance detection device further includes: a turbine-side housing member accommodating the turbine wheel; a compressor-side housing member accommodating the compressor wheel; a support mechanism configured to nip and support the turbo-cartridge from both sides by pressing at least one of the turbine-side housing member or the compressor-side housing member toward the turbo-cartridge; and a vibration insulator interposed in each of a gap between the turbine-side housing member and the turbo-cartridge and a gap between the compressor-side housing member and the turbo-cartridge. The specific direction is a direction of a position of the bearing housing.

With the above configuration (4), the turbo-cartridge is supported in a state where the turbo-cartridge is nipped from both sides by the turbine-side housing member and the compressor-side housing member via the vibration insulator. In other words, the vibration insulator insulates vibration between the unbalance detection device and the turbo-cartridge (reduce transmitted vibration). Accordingly, in the unbalance detection work, it is possible to suppress resonance of the unbalance detection device in response to vibration upon rotation of the rotor. Further, vibration not affected by resonance is detected through measurement of the sound pressure from the bearing housing by the sound pressure sensor, and thereby it is possible to improve the efficiency of the balancing work while improving the detection accuracy of unbalance of the rotor.

(5) In some embodiments, in the above configuration (4), the turbo-cartridge is supported by the support mechanism in a state where the turbo-cartridge is in contact with the vibration insulator while not being in contact with the turbine-side housing member and the compressor-side housing member.

With the above configuration (5), the turbo-cartridge is supported on the support mechanism only via the vibration insulator. Thus, with the vibration insulator, it is possible to insulate vibration between the unbalance detection device and the turbo-cartridge even more appropriately.

(6) In some embodiments, in any one of the above configurations (1) to (5), the unbalance detection device further includes an oil supply pipe for supplying lubricant oil into the bearing housing, the oil supply pipe being configured to be connectable to and separatable from an oil supply port formed on the bearing housing. The sound pressure sensor is fixed to the oil supply pipe.

With the above configuration (6), the sound pressure sensor is installed on the bearing housing when the oil supply pipe is connected to the oil supply port of the bearing housing. That is, connection of the oil supply pipe to the oil supply port of the bearing housing is in conjunction with installation of the sound pressure sensor. Accordingly, it is possible to install the sound pressure sensor on the bearing housing efficiently, and perform the unbalance detection work efficiently.

(7) In some embodiments, in the above configuration (6), the sound pressure sensor is fixed to the oil supply pipe so as to be separated by a predetermined distance from the bearing housing in a state where the oil supply pipe is connected to the oil supply port.

With the above configuration (7), by connecting the oil supply pipe to the oil supply port, it is possible to install the sound pressure sensor in a non-contact state separated from the bearing housing.

(8) In some embodiments, in the above configuration (7), the predetermined distance is 0.5 to 2.0 mm.

With the above configuration (8), by connecting the oil supply pipe to the oil supply port, it is possible to install the sound pressure sensor in a state where the sound pressure sensor is separated from the bearing housing by the predetermined distance suitable for vibration detection of the rotor, and detect vibration upon rotation of the rotor accurately.

(9) In some embodiments, in any one of the above configurations (6) to (8), the bearing housing includes a sensing surface having a flat surface shape to face the sound pressure sensor, and the sensing surface is disposed such that a normal direction of an opening plane of the oil supply port and a normal direction of the sensing surface are the same.

With the above configuration (9), the sensing surface having a flat surface shape is formed on the bearing housing such that the normal direction of the sensing surface and the normal direction of the opening plane of the oil supply port are the same. Accordingly, in a state where the oil supply pipe and the oil supply port are connected, it is possible to arrange the sound pressure sensor and the sensing surface so as to be parallel to each other, and measure the sound pressure from the bearing housing appropriately.

(10) In some embodiments, in any one of the above configurations (6) to (9), the sound pressure sensor is fixed to the oil supply pipe via a sensor-side vibration insulator.

With the above configuration (10), by using the sensor-side vibration insulator, it is possible to insulate vibration between the sound pressure sensor and the unbalance detection device, via the oil supply pipe as a vibration transmission path. Accordingly, it is possible to enhance the accuracy of detection of the vibration signal from the rotor by the vibration sensor.

(11) In some embodiments, in the above configuration (10), the sensor-side vibration insulator is a sponge.

With the above configuration (11), by connecting the sound pressure sensor and the oil supply pipe via a sponge, it is possible to insulate vibration between the sound pressure sensor and the unbalance detection device, via the oil supply pipe as a vibration transmission path.

(12) According to at least one embodiment of the present invention, an unbalance detection method for detecting unbalance of a rotor of a turbo-cartridge which includes the rotor including a turbine wheel and a compressor wheel coupled via a rotational shaft and a bearing housing accommodating a bearing which supports the rotor rotatably, includes: a vibration insulator installation step of interposing a vibration insulator in each of a gap between the turbo-cartridge and a turbine-side housing member which accommodates the turbine wheel of the rotor and a gap between the turbo-cartridge and a compressor-side housing member which accommodates the compressor wheel of the rotor; a support step of nipping and supporting the turbo-cartridge from both sides by pressing at least one of the turbine-side housing member or the compressor-side housing member toward the turbo-cartridge via the vibration insulator; and a measurement step of contactlessly measuring a sound pressure generated from vibration upon rotation of the rotor by using a sound pressure sensor capable of detecting vibration upon rotation of the rotor.

With the above configuration (12), similarly to the above (4), in the unbalance detection work, it is possible to suppress resonance of the unbalance detection device in response to vibration upon rotation of the rotor, and it is possible to improve the efficiency of the balancing work while improving the accuracy of unbalance detection of the rotor. Further, vibration not affected by resonance is detected through measurement of the sound pressure from the bearing housing by the sound pressure sensor, and thereby it is possible to improve the efficiency of the balancing work while improving the detection accuracy of unbalance of the rotor.

(13) In some embodiments, in the above configuration (12), the support step includes supporting the turbo-cartridge in a state where the turbo-cartridge is in contact with the vibration insulator while not being in contact with the turbine-side housing member and the compressor-side housing member.

With the above configuration (13), similarly to the above (5), with the vibration insulator, it is possible to insulate vibration between the unbalance detection device and the turbo-cartridge even more appropriately.

(14) In some embodiments, in the above configuration (12) or (13), the unbalance detection method further includes a sensor fixing step of fixing the sound pressure sensor to an oil supply pipe for supplying lubricant oil into the bearing housing so that the sound pressure sensor is separated from the bearing housing by a predetermined distance, by connecting the oil supply pipe to an oil supply port formed on the bearing housing.

With the above configuration (14), similarly to the above (7), by connecting the oil supply pipe to the oil supply port, it is possible to install the sound pressure sensor in a non-contact state separated from the bearing housing.

(15) In some embodiments, in the above configuration (14), the predetermined distance is 0.5 to 2.0 mm.

With the above configuration (15), similarly to the above (8), by connecting the oil supply pipe to the oil supply port, it is possible to install the sound pressure sensor in a state where the sound pressure sensor is separated from the bearing housing by the predetermined distance suitable for vibration detection of the rotor, and detect vibration upon rotation of the rotor accurately.

Advantageous Effects

According to at least one embodiment of the present invention, provided is an unbalance detection device which detects vibration upon rotation of the rotor of the turbo-cartridge with a sound pressure sensor.

BRIEF DESCRIPTION OF DRAWINGS

FIG. 8 is a flowchart showing an unbalance detection method according to an embodiment of the present invention.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
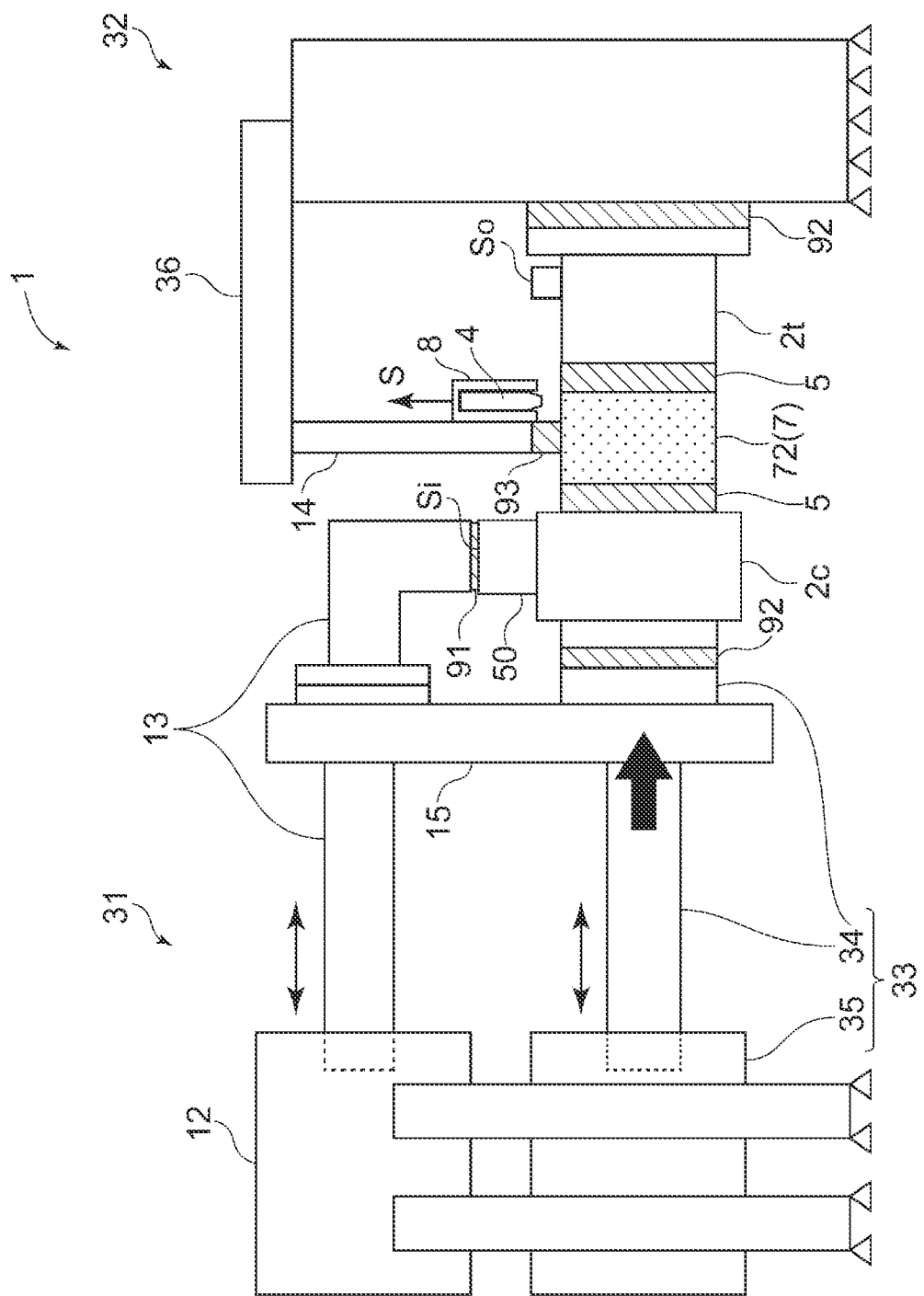
FIG. 1 is a schematic diagram of an unbalance detection device according to an embodiment of the present invention, illustrating a state where a turbo-cartridge is supported by the unbalance detection device.
Figure 2:
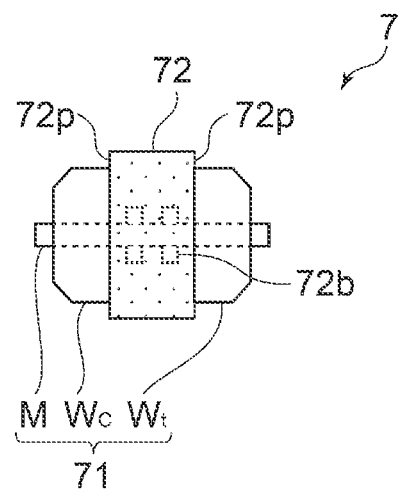
FIG. 2 is a diagram schematically showing a turbo-cartridge according to an embodiment of the present invention.
Figure 3:
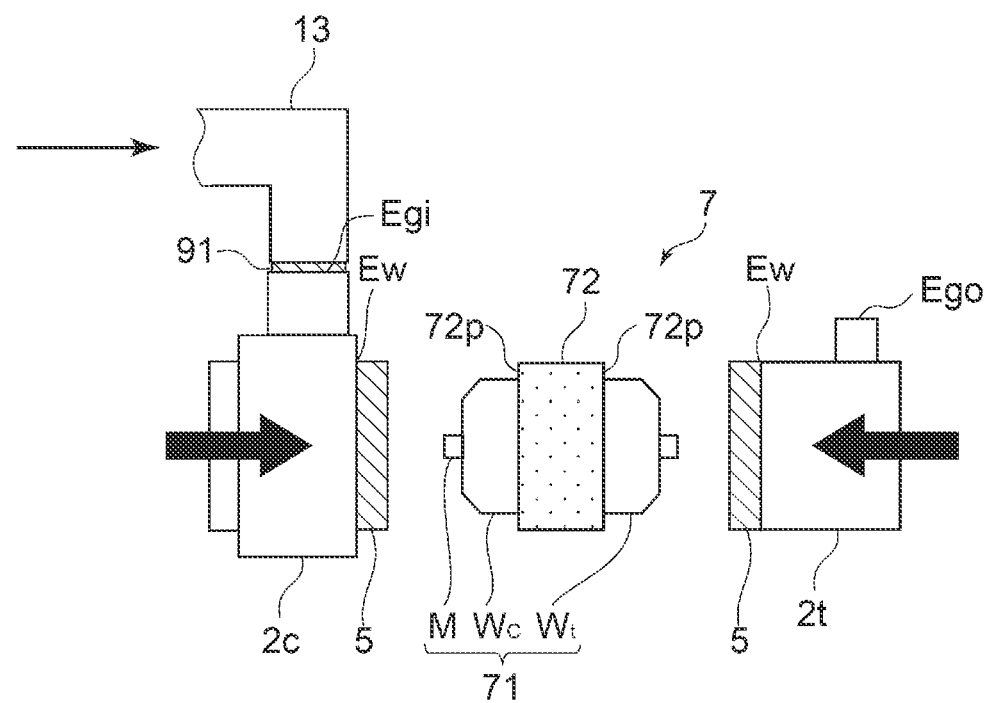
FIG. 3 is a diagram for describing how the turbo-cartridge in FIG. 2 is nipped and supported from both sides with housing members of the unbalance detection device.

FIG. 1 is a schematic diagram of an unbalance detection device 1 according to an embodiment of the present invention, where a turbo-cartridge 7 is supported by the unbalance detection device 1. FIG. 2 is a diagram schematically showing the turbo-cartridge 7 according to an embodiment of the present invention. Further, FIG. 3 is a diagram for describing how the turbo-cartridge 7 in FIG. 2 is nipped and supported from both sides with housing members (2t, 2c) of the unbalance detection device 1.

The unbalance detection device 1 is a device used in the balancing work of the rotor 71 of the turbo-cartridge 7. The unbalance detection device 1 is configured to be capable of supporting the turbo-cartridge 7 by the clamp method in a state where the rotor 71 is rotatable, and detecting vibration upon rotation that occurs due to unbalance of the rotor 71. The clamp method mentioned herein refers to the support method of supporting the turbo-cartridge 7 by a force applied in directions facing each other from both sides of the axial direction of the rotational shaft M of the rotor 71 (pressing force). Specifically, as depicted in FIGS. 1 to 3, the unbalance detection device 1 nips the cartridge 7 from both sides to support the turbo-cartridge 7 with two housing members: a turbine-side housing member 2t and a compressor-side housing member 2c. Thus, in the clamp method, bolt fastening is not used along with the support, such as further fastening the two housing members with bolts, or fastening each of the two housing members with the turbo-cartridge 7 (bearing housing 72 described below) with bolts. Furthermore, the unbalance detection device 1 detects vibration during rotation of the rotor 71 while rotating the rotor 71 at a predetermined rotation speed (unbalance detection rotation speed N). It is possible to obtain the vibration property V by performing frequency analysis such as Fourier transform on the detected vibration signal S (see FIG. 4 described below).

Meanwhile, the cartridge 7 is a core member of the turbocharger, and includes a rotor 71 integrally coupling a turbine wheel Wt and a compressor wheel Wc with the rotational shaft M, and a bearing housing 72 that accommodates a bearing (not depicted) supporting the rotor 71 rotatably (see FIG. 2). Further, when the turbo-cartridge 7 is provided for an engine of a non-depicted automobile, for instance, the turbo-cartridge 7 is configured such that the turbine wheel Wt disposed in the exhaust passage of the engine rotates due to exhaust gas discharged from the engine, and thereby the compressor wheel Wc coaxially coupled by the rotational shaft M rotates in the intake passage of the engine, thereby compressing intake air to the engine. In the embodiment depicted in FIGS. 1 to 3, the turbo-cartridge 7 is a component of a turbocharger including a radial turbine.

Herein, as depicted in FIG. 1, the unbalance detection device 1 includes a sound pressure sensor 4 capable of detecting vibration upon rotation of the rotor 71 by contactlessly measuring the sound pressure P generated from vibration upon rotation of the rotor 71. In other words, the sound pressure sensor 4 is a pressure sensor. In the embodiment depicted in FIGS. 1 to 3, the sound pressure sensor 4 is a microphone. That is, the sound pressure sensor 4 is a sensor for measuring the sound in the frequency range of audible sounds to human (normally, 20 Hz to 20 kHz). When converted to the sound pressure P, the frequency range of audible sounds is 20 μPa (micro pascal) to 20 Pa (pascal). Sounds having frequency out of the frequency range of audible sounds are ultrasonic waves.

Furthermore, also depending on vibration of a measurement target, the sound pressure sensor 4 has a self-noise level of 50 B or below. While the self-noise level should be as low as possible, the more preferable range is 40 dB or below. In the embodiment depicted in FIGS. 1 to 3, the microphone (sound pressure sensor 4) has a self-noise level of approximately 40 dB. That is, the microphone itself generates noise at a level of approximately 40 dB, which is the minimum value for the microphone, which can pick sounds greater than the minimum value. Generally, the relationship between the sound pressure level Lp and the sound pressure P can be expressed by Lp=20×log (sound pressure P/reference sound pressure) using common logarithm. Thus, when the reference sound pressure is 20 µPa, the microphone has a sound pressure resolution of 0.002 µPa. Further, when the resolution of a microphone having a self-noise of 40 dB is expressed as the vibration velocity 'v' (m/s) of the radiation surface, the resolution is 0.005 mm/s, from the following relationship between the vibration velocity v (m/s) of the radiation surface and the sound pressure P (Pa) near the radiation surface. Thus, the resolution is a vibration velocity 'v' of 0.005 mm/s or higher. Generally, the relationship between the vibration velocity 'v' of the radiation surface and the sound pressure P near the radiation surface at the time when the radiation surface vibrates at the vibration velocity v (m/s) upon emission of sound is expressed by P=ρcv. In the calculation of the above vibration velocity v, 'ρ' is the air density (1.2 kg/m3), and 'c' is the sonic speed in the air (340 m/s).

For instance, assume that, in a state where a turbocharger including the turbo-cartridge 7 mounted thereto is installed on an engine, the rotor 71 vibrates at f=4000 Hz at maximum upon rotation. Generally, the vibration acceleration 'a' is a=2πfv ('v' is the above vibration velocity 'v'). Further, the vibration displacement 'x' is x=v/(2πf). When the vibration velocity 'v' is 0.005 mm/s and f=4000 Hz are substituted in the above relational expression, the vibration acceleration 'a' upon rotation of the rotor 71 under the present assumption is 0.12 (m/s$^2$), and the vibration displacement 'x' is 0.0002 µm. That is, although depending on the value of 'f' as well, the sound pressure sensor 4 has a resolution capable of detecting vibration whose vibration displacement 'x' is up to approximately 0.0001 µm, and vibration upon rotation of the rotor can be detected appropriately with a necessary resolution. Furthermore, existing common non-contact type vibration sensors (e.g. eddy-current type sensors, laser sensors) for detecting a vibrating object has a resolution of approximately 1 µm. Some expensive non-contact type vibration sensors have a resolution of as high as 0.01 µm. Nevertheless, the sound pressure sensor 4 has a high resolution that is 0.001 µm at 4000 Hz, and is advantageous in terms of both cost and accuracy compared to non-contact type vibration sensors.

With the above configuration, the unbalance detection device 1 is configured to detect vibration upon rotation of the rotor 71, by utilizing the sound pressure sensor 4 for detecting the sound pressure P (sound), such as the microphone. The vibration upon rotation of the rotor 71 cannot be detected appropriately with a resolution of non-contact type sensors, but can be detected with the resolution of the sound pressure sensor 4 as described above. Accordingly, it is possible to detect vibration upon rotation of the rotor 71 by using the sound pressure sensor 4. Further, in a case where the turbo-cartridge 7 is supported by the clamp method via the vibration insulator 5 as described below, the non-contact type sound pressure sensor 4 can be installed without requiring attaching and removing work for each mass-produced turbo-cartridge 7. Accordingly, it is possible to improve the efficiency of the unbalance detection work by detecting vibration upon rotation of the rotor 71 by using the sound pressure sensor 4.

Furthermore, in some embodiments, the sound pressure sensor 4 includes a microphone having directional characteristics capable of picking a sound pressure P from a specific direction, or is configured to measure the sound pressure P from a specific direction on the basis of respective sound pressures P detected by a plurality of microphones. That is, in any one of the methods, the sound pressure sensor 4 is configured to measure the sound pressure P coming in from a specific direction. For instance, a microphone having no directional characteristics would pick up sound pressures P other than that of a target object, but such sound pressures P are disturbance in the vibration detection of the rotor 71. Thus, by using a microphone having directional characteristics, or by performing signal processing on the sound pressure P from a plurality of microphones, it is possible to measure the sound pressure P only in a specific direction. Accordingly, it is possible to enhance the detection accuracy of vibration upon rotation of the rotor, by measuring only the sound pressure P coming in from the bearing housing 72 of the turbo-cartridge 7.

Figure 4:
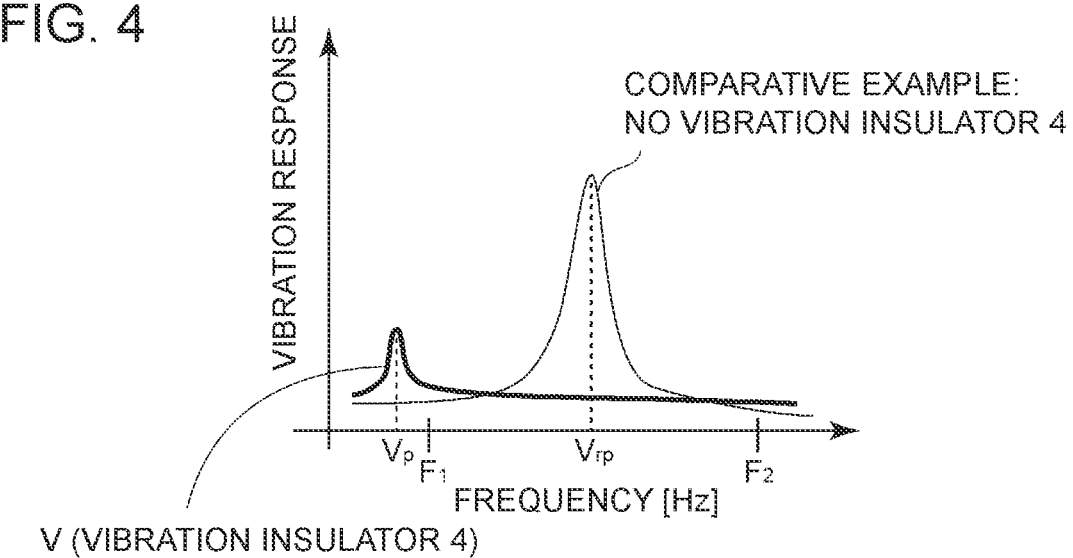
FIG. 4 is a diagram for describing the vibration property in a state where the rotor supporting the turbo-cartridge via a vibration insulator is in rotation, according to an embodiment of the present invention.
Figure 5:
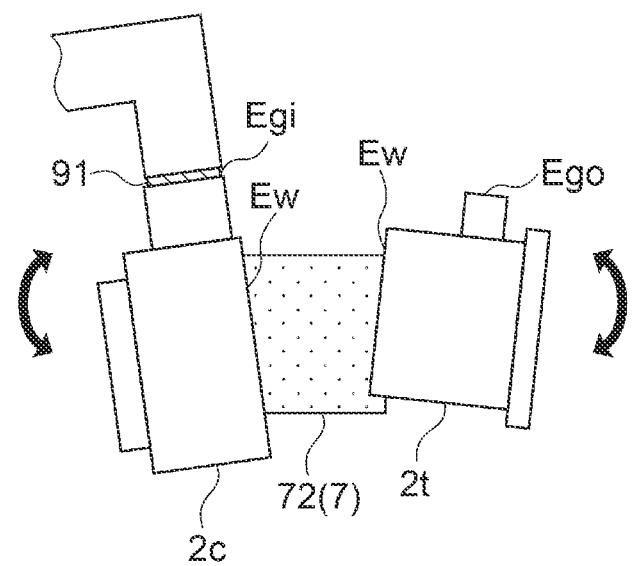
FIG. 5 is a reference diagram for describing the vibration mode that occurs when the turbo-cartridge is supported without using a vibration insulator, according to an embodiment of the present invention.

Next, the configuration of the unbalance detection device 1 will be described in detail with reference to FIGS. 1 to 5. FIG. 4 is a diagram for describing the vibration property V in a state where the rotor 71 supporting the turbo-cartridge 7 via a vibration insulator 5 is in rotation, according to an embodiment of the present invention. FIG. 5 is a reference diagram for describing the vibration mode that occurs when the turbo-cartridge 7 is supported without using a vibration insulator 5, according to an embodiment of the present invention.

As depicted in FIGS. 1 to 3, the unbalance detection device 1 includes a turbine-side housing member 2t, a compressor-side housing member 2c, a support mechanism 3, the above described sound pressure sensor 4, and a vibration insulator 5. Hereinafter, each of the above features of the unbalance detection device 1 will be described.

The turbine-side housing member 2t is a housing member capable of accommodating the turbine wheel Wt. Furthermore, the compressor-side housing member 2c is a housing member capable of accommodating the compressor wheel Wc. That is, the housing members (2t, 2c) each include an interior space for accommodating a wheel (Wt, Wc) such as the turbine wheel Wt and the compressor wheel Wc, and a wheel opening Ew through which the wheel can be carried in and out the interior space. Further, when the unbalance detection device 1 supports the turbo-cartridge 7, as depicted in FIG. 3, the turbine wheel Wt is accommodated in the interior space of the turbine-side housing member 2t via the wheel opening Ew, and the compressor wheel Wc is accommodated in the interior space of the compressor-side housing member 2c via the wheel opening Ew. At this time, each of the two housing members supports a support-receive portion 72p formed on the bearing housing 72 of the turbo-cartridge 7, and thereby supports the turbo-cartridge 7. The support-receive portion 72p is disposed in a region of the bearing housing 72 facing the edge portion of the wheel opening Ew of the housing member (see FIGS. 2 and 3).

Further, in a state where the turbo-cartridge 7 is supported on the unbalance detection device 1, the rotor 71 is rotated by supplying air (gas) to one of the compressor wheel Wc or the turbine wheel Wt. The air for rotating the rotor 71 is supplied via an air opening Eg formed on the housing member. In the embodiment depicted in FIGS. 1 to 4, the unbalance detection device 1 is configured to rotate the rotor 71 by supplying air to the compressor wheel Wc accommodated in the compressor-side housing member 2c. Thus, on the compressor-side housing member 2c, an inlet-side air opening Egi (air opening Eg) is formed so that air can be supplied in the radial direction to the compressor wheel Wc accommodated therein, and a non-depicted outlet-side air opening (air opening Eg) is formed to discharge supplied air from the interior space of the compressor-side housing member 2c. Furthermore, the unbalance detection device 1 is configured to connect a blower 12 for supplying air and the inlet-side air opening Egi of the compressor-side housing member 2c via the air supply pipe 13, and supply air to the compressor wheel Wc from the blower 12. Furthermore, the air supply pipe 13 and the housing member (in the present embodiment, the compressor-side housing member 2c) is connected via a pipe vibration insulator 91 (e.g. elastic member such as rubber), so as to reduce vibration on the side of the unbalance detection device 1 transmitted to the housing member (2c) via the air supply pipe 13 as a vibration transmission path.

Furthermore, at the rotor 71, the turbine wheel Wt rotates along with rotation of the compressor wheel Wc, and thereby the turbine wheel Wt generates a flow of air. Thus, in the embodiment depicted in FIGS. 1 to 3, on the turbine-side housing member 2t, air openings Eg are formed, such as the outlet-side air opening Ego and the inlet-side air opening Egi (not shown), for allowing a flow of air generated by rotation of the compressor wheel Wc to flow outside. In some other embodiments, air may be supplied to the turbine wheel Wt to rotate the rotor 71. In this case, the inlet-side air opening Egi and the outlet-side air opening Ego are formed on the turbine-side housing member 2t, and at least the outlet-side air opening Ego is formed on the compressor-side housing member 2c.

The support mechanism 3 is configured to nip and support the turbo-cartridge 7 from both sides, by pressing at least one of the turbine-side housing member 2t or the compressor-side housing member 2c toward the turbo-cartridge 7. As depicted in FIG. 1, the support mechanism 3 includes a compressor-side support mechanism 31 connected to the compressor-side housing member 2c, and a turbine-side support mechanism 32 connected to the turbine-side housing member 2t. The compressor-side support mechanism 31 and the turbine-side support mechanism 32 are each fixed to the floor of the factory, for instance, so that the turbo-cartridge 7 does not move when pushed. Furthermore, both of the support mechanisms (31, 32) are connected to the turbine-side housing member 2t and the compressor-side housing member 2c, above the floor surface, so that the housing members (2t, 2c) do not make contact with the floor surface. At this time, connection between the compressor-side housing member 2c and the compressor-side support mechanism 31 (pressing rod 34 of the pressing device 33 described below), and connection between the turbine-side housing member 2t and the turbine-side support mechanism 32 are each achieved via a support-mechanism vibration insulator 92 (e.g. elastic member such as rubber), so as to reduce vibration on the side of the unbalance detection device 1 transmitted to the housing member (2c) via the compressor-side support mechanism 31 and the turbine-side support mechanism 32 as vibration transmission paths.

In the embodiment depicted in FIGS. 1 to 4, the compressor-side support mechanism 31 includes a pressing device 33 configured to press the compressor-side housing member 2c toward the turbo-cartridge 7. More specifically, as depicted in FIG. 1, the pressing device 33, the compressor-side housing member 2c, the turbo-cartridge 7, the turbine-side housing member 2t, and the turbine-side support mechanism 32 are arranged in this order along the pressing direction (direction of the arrow in FIGS. 1 and 3). Thus, the pressing force by the pressing device 33 is transmitted to the turbine-side support mechanism 32 through the above arrangement, and the turbo-cartridge 7 is supported by the pressing force from the pressing device 33 and the reactive force from the turbine-side support mechanism 32. Further, in the embodiment depicted in FIGS. 1 to 4, the pressing device 33 includes a pressing rod 34 connected to the housing member (2c), and a piston device 35 that pushes the pressing rod 34 out toward the housing member (2c). Further, as the piston device 35 pushes the pressing rod 34 out toward the housing member (2c), the housing member (2c) is pressed toward the turbo-cartridge 7. Furthermore, the pressing rod 34 and the air supply pipe 13 are coupled to each other via a coupling member 15, and the air supply pipe 13 is configured to be movable so as to expand and contract from the blower 12 as the pressing rod 34 moves in the pressing direction.

As described above, the sound pressure sensor 4 picks sounds in the above described specific direction, which is the positional direction of the bearing housing 72. That is, in the embodiment depicted in FIGS. 1 to 3, the sound pressure sensor 4 is configured to measure the sound pressure P (sound) coming in from the bearing housing 72 of the turbo-cartridge 7 (see FIG. 7 described below). The bearing housing 72 supports the bearing 72b (see FIG. 2) inside thereof, and supports the rotor 71 via the bearing 72b. That is, vibration upon rotation of the rotor 71 that occurs due to unbalance of the rotor 71 is transmitted to the bearing housing 72 via the bearing 72b. Further, due to vibration transmitted to the bearing housing 72, air around the bearing housing 72 vibrates, and the sound pressure sensor 4 detects the pressure of the air (pressure change). Further, the vibration signal S is generated on the basis of the measured sound pressure. Further, in the embodiment depicted in FIGS. 1 to 3, the sound pressure sensor 4 is fixed to the oil supply pipe 14, as described below. Nevertheless, the present invention is not limited to this embodiment, and the sound pressure sensor 4 may be fixed to an object other than the turbo-cartridge 7. For instance, in some other embodiments, the sound pressure sensor 4 may be fixed to a portion of the unbalance detection device 1 other than the oil supply pipe 14. Alternatively, the sound pressure sensor 4 may be installed on an object (structure) around the unbalance detection device 1, or by using a device for installing the sound pressure sensor 4.

The vibration insulator 5 is interposed in each of the gap between the turbine-side housing member 2t and the turbo-cartridge 7, and the gap between the compressor-side housing member 2c and the turbo-cartridge 7. The vibration insulator 5 is a member capable of insulating the housing members (2t, 2c) and the turbo-cartridge 7 in terms of vibration (reduce vibration), and is formed of an elastic member such as rubber. The vibration insulator 5 may be a member formed of the same material as the above described pipe vibration insulator 91 and the support-mechanism vibration insulator 92. In the embodiment depicted in FIGS. 1 to 4, as described above, the housing members (2t, 2c) support the support-receive portion 72p of the bearing housing 72 via the vibration insulator 5. Specifically, the vibration insulator 5 is disposed on the edge portion of the wheel opening Ew of each of the two housing members (see FIG. 3). Further, when the wheel is housed in each housing member and the turbo-cartridge 7 is nipped by the two housing members, the vibration insulator 5 disposed on the edge portion of the wheel opening Ew of the housing member makes contact with the support-receive portion 72p of the bearing housing 72. In the present embodiment, the wheel opening Ew has a circular shape. Thus, the vibration insulator 5 has an annular shape having a greater diameter than the wheel opening Ew. Accordingly, the support-receive portion 72p has a circular shape.

As described above, the turbo-cartridge 7 is supported via the vibration insulator 5, and thereby it is possible to suppress (avoid) resonance of the unbalance detection device 1 including the housing members (2t, 2c) in response to vibration when the rotor 71 is rotated at the above described unbalance detection rotation speed N. This point will be described with reference to FIGS. 4 and 5.

In FIG. 4, x-axis is the frequency (Hz), and y-axis is the vibration response (magnitude of vibration). Further, the unique frequency of the unbalance detection device 1 including the housing members (2t, 2c) according to the present embodiment is in between the lower limit frequency F1 and the upper limit frequency F2, which is higher than the lower limit frequency F1. Further, the vibration property V (frequency property of vibration property) indicated by the solid line in FIG. 4 corresponds to a case where the turbo-cartridge 7 is supported via the vibration insulator 5 as in the above described embodiment. As indicated by the solid line in FIG. 4, when the rotor 71 is rotated at the unbalance detection rotation speed N, the vibration component when the frequency is Vp is the peak of vibration response. However, the peak frequency Vp is lower than the lower limit frequency F1 (Vp<F1), and is out of the range of the unique frequency (range between F1 and F2) of the unbalance detection device 1. Further, the vibration response in the range of the unique frequency is so small that the effect on the unbalance detection work can be ignored.

In contrast, the vibration property Vr indicated by the thin line in FIG. 4 as a comparative example corresponds to a case where the turbo-cartridge 7 is supported by two housing members (2t, 2c) being in direct contact with the support-receive portion 72p of the turbo-cartridge 7. As indicated by the thin line in FIG. 4, when the rotor 71 is rotated at the unbalance detection rotation speed N, in the vibration property Vr of the comparative example, the vibration component when the frequency is Vpr is the peak of vibration response. Further, the peak frequency Vrp of the comparative example is in between the lower limit frequency F1 and the upper limit frequency F2 (F1≤Vrp≤F2). Thus, in the unbalance detection work, due to the above described difference in the manner of contact between the bearing housing 72 and the housing members, resonance occurs when the unique frequency of the unbalance detection device 1 and the peak frequency (Vrp) are equal. For instance, as depicted in FIG. 5, resonance generates such vibration that the turbo-cartridge 7 and the two housing members (2t, 2c) nipping the turbo-cartridge 7 bend as a whole. The vibration upon rotation of the rotor 71 detected at the time of occurrence of such resonance is affected significantly by resonance, and does not appropriately reflect vibration due to unbalance of the rotor 71. Thus, it is difficult to balance the rotor 71 on the basis of the grinding information calculated from the vibration signal S detected at the time of resonance.

With the above configuration, the turbo-cartridge 7 is supported in a state where the turbo-cartridge 7 is nipped from both sides by the turbine-side housing member 2t and the compressor-side housing member 2c via the vibration insulator 5. In other words, the vibration insulator 5 insulates vibration between the unbalance detection device 1 and the turbo-cartridge 7. Accordingly, in the unbalance detection work, it is possible to suppress resonance of the unbalance detection device 1 in response to vibration upon rotation of the rotor 71. Further, vibration not affected by resonance is detected through measurement of the sound pressure P from the bearing housing 72 by the sound pressure sensor 4, and thereby it is possible to improve the efficiency of the balancing work while improving the detection accuracy of unbalance of the rotor 71.

Furthermore, in the embodiment depicted in FIGS. 1 to 4, as depicted in FIG. 1, the turbo-cartridge 7 is supported by the support mechanism 3 in a state where the turbo-cartridge 7 is not in contact with the turbine-side housing member 2t and the compressor-side housing member 2c, but with the vibration insulator 5. In other words, the turbo-cartridge 7 is supported on the support mechanism 3 only via the vibration insulator 5. Thus, with the vibration insulator 5, it is possible to insulate vibration between the unbalance detection device 1 and the turbo-cartridge 7 even more appropriately.

Figure 6A:
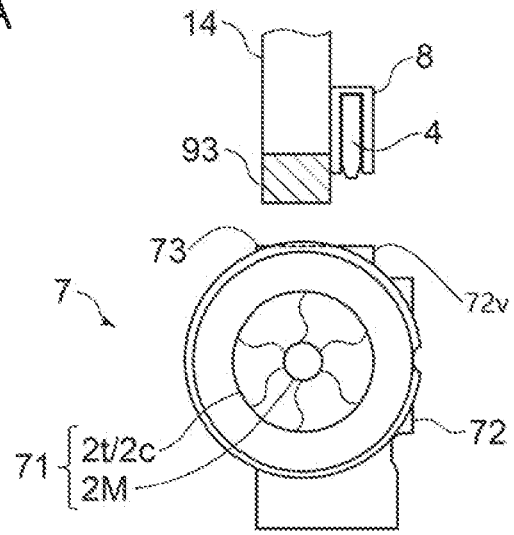
FIG. 6A is a schematic side view of a state where a sound pressure sensor according to an embodiment of the present invention is fixed to an oil supply pipe, where a sound pressure sensor is detached from the bearing housing.
Figure 6B:
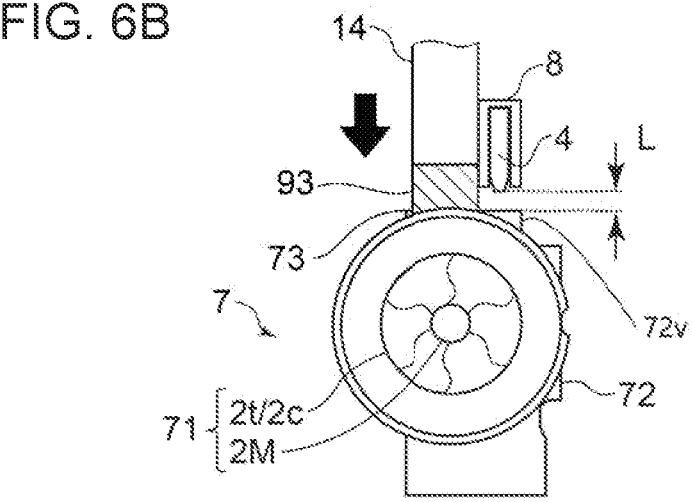
FIG. 6B is a schematic side view of a state where a sound pressure sensor according to an embodiment of the present invention is fixed to an oil supply pipe, where a sound pressure sensor is installed on the bearing housing.
Figure 7:
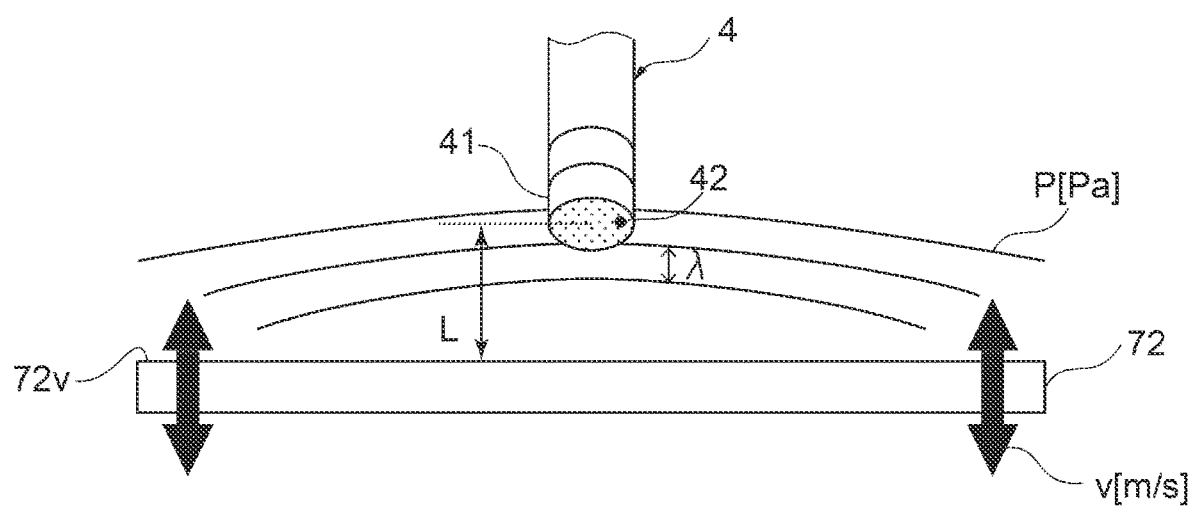
FIG. 7 is a schematic diagram for describing the position relationship in an installation state of a sound pressure sensor and a bearing housing according to an embodiment of the present invention.

Next, installation of the sound pressure sensor 4 on the bearing housing 72 will be described in detail with reference to FIGS. 1, 6A to 7. FIG. 6A is a schematic side view of a state where the sound pressure sensor 4 according to an embodiment of the present invention is fixed to an oil supply pipe 14, where the sound pressure sensor 4 is detached from the bearing housing 72. FIG. 6B is a schematic side view of a state where the sound pressure sensor 4 according to an embodiment of the present invention is fixed to the oil supply pipe 14, showing a state where the sound pressure sensor 4 is installed on the bearing housing 72. FIG. 7 is a schematic diagram for describing the position relationship in an installation state of the sound pressure sensor 4 and the bearing housing 72 according to an embodiment of the present invention.

In some embodiments, as depicted in FIGS. 1, 6A and 6B, the unbalance detection device 1 further includes an oil-supply pipe 14 for supplying lubricant oil to the interior of the bearing housing 72, configured to be connectable to and separatable from the oil supply port 73 formed on the bearing housing 72. Further, as depicted in FIGS. 6A and 6B, the sound pressure sensor 4 is fixed to the oil supply pipe 14, as described below. In the embodiment depicted in FIGS. 1 to 6B, the oil supply pipe 14 is supported on the tip side of the support arm 36 extending toward the compressor-side support mechanism 31 from an upper part of the turbine-side support mechanism 32. Furthermore, in a state where the turbo-cartridge 7 is supported by the support mechanism 3, the oil supply port 73 of the bearing housing 72 is facing upward in the vertical direction, and the oil supply pipe 14 is disposed above the turbo-cartridge 7 (see FIG. 1).

Furthermore, the support arm 36 is capable of moving the oil supply pipe 14 up and down along the vertical direction, and the oil supply pipe 14 and the oil supply port 73 are connected as the oil supply pipe 14 is moved downward in the vertical direction (direction of the gravity). At this time, an oil-supply-pipe vibration insulator 93 is disposed on a portion of the oil supply pipe 14 in contact with the oil supply port 73, so as to reduce vibration of the unbalance detection device 1 transmitted to the turbo-cartridge 7 via the oil supply pipe 14 as a transmission path. Further, when the oil supply pipe 14 is connected to the oil supply port 73, the sound pressure sensor 4 is installed on the bearing housing 72. That is, connection of the oil supply pipe 14 to the oil supply port 73 of the bearing housing 72 is in conjunction with installation of the sound pressure sensor 4. Accordingly, it is possible to install the sound pressure sensor 4 on the bearing housing 72 efficiently, and perform the unbalance detection work efficiently.

More specifically, as depicted in FIG. 7, in a state where the oil supply pipe 14 is connected to the oil supply port 73 (installation state), the sound pressure sensor 4 is fixed to the oil supply pipe 14 so as to be separated from the bearing housing 72 by a predetermined distance L. In FIG. 7, the emission surface (sensing surface 72v) of the sound including the bearing housing 72 is vibrating at the vibration velocity v (m/s), and the air is transmitted through the air by the vibration. Further, in the installation state, at a position separated from the sensing surface 72v by a predetermined distance L, the sound picking surface 42 of the sound picking portion 41 of the sound pressure sensor 4 is positioned. The sound pressure sensor 4 measures sounds that reach the sound picking surface 42. Accordingly, by connecting the oil supply pipe 14 to the oil supply port 73, it is possible to install the sound pressure sensor 4 in a non-contact state separated from the bearing housing 72.

The above predetermined distance L is determined so as to be a distance suitable for detecting vibration of the rotor. For instance, when the sound pressure sensor 4 (sound picking surface 42) is too far away from the sensing surface 72v to be measured, it may become difficult to measure sounds emitted from the sensing surface 72v accurately. For example, the sound pressure sensor 4 may pick sound pressure P due to vibration of another emission surface; the sound pressure P to be picked may become small due to radial diffusion of sound; and phase lag of sound transmitting through the air may occur. Thus, it is necessary to measure the sound (sound pressure P) at a possible closest position. Further, in some embodiments, the predetermined distance L is 0.5-2.0 mm. The upper limit value (2.0 mm) is determined as a range where the phase lag is not greater than 10 degrees, and an effect of distance attenuation due to diffusion of sound waves can be ignored. For instance, assuming a case where vibration occurs at most 4000 Hz upon rotation of the rotor 71, the sonic speed is 340 m/s, and thus the vibration wavelength $\lambda$ of the vibration is 340÷4000=85 mm. For instance, when the above predetermined distance L is 1 mm, the phase lag is 1 mm÷85 mm×360 degrees=4 degrees, which falls within the allowable range. Further, the lower limit value (0.5 mm) is a value for absorbing errors due to the installation condition, and installing the sound pressure sensor 4 reliably in a non-contact state. Furthermore, preferably, the sound pressure sensor 4 and the bearing housing 72 may be separated by the above predetermined distance L, not only in a case where the sound pressure sensor 4 is fixed to the oil supply pipe 14, but also in a case where the sound pressure sensor 4 is installed by another method.

Further, in some embodiments, as depicted in FIGS. 1, 6A, and 6B, the bearing housing 72 includes a sensing surface 72v having a flat surface shape and facing the sound pressure sensor 4. The sensing surface 72v is disposed such that the normal direction of the opening plane of the oil supply port 73 and the normal direction of the sensing surface 72v are the same. In the embodiment depicted in FIGS. 6A and 6B, the sound picking surface 42 of the sound pressure sensor 4 is formed to have a flat surface shape, and the sensing surface 72v having a flat surface shape is formed on the bearing housing 72 such that the normal direction of the sensing surface 72v and the normal direction of the opening plane of the oil supply port 73 are the same. Accordingly, by connecting the oil supply pipe 14 to the bearing housing 72, it is possible to arrange the sound pressure sensor 4 (sound picking surface 42) and the sensing surface 72v so as to be parallel to each other when the sound pressure sensor 4 is installed on the bearing housing 72, and measure the sound pressure P from the bearing housing 72 appropriately.

Further, in some embodiments, as depicted in FIGS. 1, 6A, and 6B, the sound pressure sensor 4 is fixed to the oil supply pipe 14 via the sensor-side vibration insulator 8. Specifically, the sensor-side vibration insulator 8 may be a sponge. In the embodiment depicted in FIGS. 6A and 6B, the sound pressure sensor 4 is surrounded by the sensor-side vibration insulator 8, excluding the side of the sound picking surface 42 of the sound picking portion 41. Furthermore, the sensor-side vibration insulator 8 is joined and fixed to the oil supply pipe 14 via adhesive. Further, in FIGS. 1, 6A, and 6B, the sensor-side vibration insulator 8 covering the sound pressure sensor 4 is only partially depicted for the sake of convenience. With the above configuration, by using the sensor-side vibration insulator 8, it is possible to insulate vibration between the sound pressure sensor 4 and the unbalance detection device 1, via the oil supply pipe 14 as a vibration transmission path. Accordingly, it is possible to enhance the accuracy of detection of the vibration signal S from the rotor 71 by the sound pressure sensor 4.

Further, in the above described embodiment, the oil supply port 73 is facing upward in a state where the turbo-cartridge 7 is supported by the support mechanism 3 (see FIGS. 1 to 4). However, the present invention is not limited to the present embodiment. For instance, the turbo-cartridge 7 may be supported on the unbalance detection device 1 so that the oil supply port 73 of the bearing housing 72 is oriented in a direction other than the upward direction. If the above other direction is more upward than the horizontal direction, it is possible to supply lubricant oil, without receiving a force component in the opposite direction due to gravity.

Hereinafter, the unbalance detection method of the rotor 71 of the turbo-cartridge 7 (hereinafter, unbalance detection method) will be described with reference to FIG. 8. FIG. 8 is a flowchart showing an unbalance detection method according to an embodiment of the present invention. As depicted in FIG. 8, the unbalance detection method includes a vibration insulator installation step (S1), a support step (S2), and a sensor installation step (S3). Further, as depicted in FIG. 8, the unbalance detection method may include a sound pressure sensor fixing step (S0), before the vibration insulator installation step (S1). Further, after the sensor installation step (S3), the method may include a rotor rotation step (S4), a vibration detection step (S5), and a grinding-information calculation step (S6), in this order.

Hereinafter, the unbalance detection method will be described with reference to the flow in FIG. 8.

In step S0 of FIG. 8, a sound pressure sensor fixing step is performed. The sound pressure sensor fixing step (S0) is a step of fixing the sound pressure sensor 4 on a component other than the turbo-cartridge 7, such as the oil supply pipe 14, and is performed as preparation for detecting unbalance of the turbo-cartridge 7. That is, in a case where the sound pressure sensor 4 is already installed on the oil supply pipe 14, the sound pressure sensor fixing step (S0) can be omitted. In some embodiments, the sound pressure sensor fixing step (S0) may include connecting the oil supply pipe 14 for supplying lubricant oil into the bearing housing 72 to the oil supply port 73 formed on the bearing housing 72, and thereby fixing the sound pressure sensor 4 on the oil supply pipe 14 so that the sound pressure sensor 4 is separated from the bearing housing 72 by a predetermined distance L. That is, it is possible to create a state where connection of the oil supply pipe 14 to the oil supply port 73 of the bearing housing 72 is in conjunction with installation of the sound pressure sensor 4 to the bearing housing 72. Further, by connecting the oil supply pipe 14 to the oil supply port 73 with the above predetermined distance being not greater than $\frac{1}{40}$ of the vibration wavelength $\lambda$ upon rotation of the rotor 71, or 0.5-2.0 mm, it is possible to install the sound pressure sensor 4 in a state where the sound pressure sensor 4 is separated from the bearing housing 72 by the predetermined distance L suitable for vibration detection of the rotor 71, and detect vibration upon rotation of the rotor 71 accurately. Further, as described above, the sound pressure sensor 4 is fixed to the oil supply pipe 14 via the sensor-side vibration insulator 8 (see FIGS. 1, 6A, and 6B).

In step S1 of FIG. 8, the vibration insulator installation step is performed. The vibration insulator installation step (S1) includes interposing the vibration insulator 5 between each of the gap between the turbine-side housing member 2t accommodating the turbine wheel Wt of the rotor 71 and the turbo-cartridge 7, and the gap between the compressor-side housing member 2c accommodating the compressor wheel We of the rotor 71 and the turbo-cartridge 7. The vibration insulator 5 is a member for insulating vibration between the two housing members (2t, 2c) and the turbo-cartridge 7, as described above. For instance, in a case where the vibration insulator 5 is disposed on each edge portion of the wheel opening Ew of each of the two housing members, the vibration insulator installation step (S1) is performed by providing the vibration insulator 5 for the unbalance detection device 1 to support the turbo-cartridge 7 (see FIG. 3).

In step S2 of FIG. 8, a support step is performed. The support step (S2) is a step of nipping and supporting the turbo-cartridge 7 from both sides in the axial direction of the rotational shaft M via the vibration insulator 5. More specifically, the support step (S2) includes nipping and supporting the turbo-cartridge 7 from both sides, by pressing at least one of the turbine-side housing member 2t or the compressor-side housing member 2c toward the turbo-cartridge 7 via the vibration insulator 5. That is, the turbo-cartridge 7 is supported by the clamp method via the vibration insulator 5. Accordingly, in the unbalance detection work, it is possible to suppress resonance of the support side of the turbo-cartridge 7 (e.g. turbine-side housing member 2t and compressor-side housing member 2c) in response to vibration upon rotation of the rotor 71, and it is possible to improve the efficiency of the balancing work while improving the unbalance detection accuracy. In the support step, the turbo-cartridge 7 may be supported in a state where the turbo-cartridge 7 is not in contact with the turbine-side housing member 2t and the compressor-side housing member 2c, but with the vibration insulator 5. In this way, it is possible to insulate vibration between the support side and the turbo-cartridge 7 more appropriately.

In step S3 of FIG. 8, a sensor installation step is performed. The sensor installation step (S3) includes installing the sound pressure sensor 4 on the bearing housing 72. More specifically, the sensor installation step includes installing the sound pressure sensor 4 capable of detecting vibration upon rotation of the rotor 71 by contactlessly measuring the sound pressure P generated from vibration upon rotation of the rotor 71 so as to measure the sound pressure P from the direction of the bearing housing 72. The sound pressure sensor 4 includes at least one microphone. The present step is performed by connecting the oil supply pipe 14 to the oil supply port 73, for instance in an embodiment in which the above described step S0 is performed, if the sound pressure sensor 4 is fixed to the oil supply pipe 14. Accordingly, it is possible to install the sound pressure sensor 4 efficiently, and perform the unbalance detection work efficiently.

Instep S4 of FIG. 8, a rotor rotation step of rotating the rotor 71 is performed. For instance, as described above, the rotor 71 is rotated by supplying air with the blower 12 to the turbine-side housing member 2t or the compressor-side housing member 2c that support the turbo-cartridge 7.

In step S5 of FIG. 8, a vibration detection step of detecting vibration upon rotation of the rotor 71 is performed. Specifically, the sound pressure sensor 4 installed on the turbo-cartridge 7 detects the vibration signal S of the above vibration generated due to unbalance of the rotor 71. Furthermore, the phase of the rotor 71 may be detected simultaneously when the sound pressure sensor 4 detects the vibration signal S. For instance, the phase (rotational position) in a single rotation of the rotor 71 can be obtained by emitting light to a reflector disposed on the blade of the turbine wheel Wt or the compressor wheel Wc, and detecting the reflection light (signal). Accordingly, it is possible to determine the phase of the rotor that is causing vibration on the basis of a relationship between the vibration signal S detected with the sound pressure sensor 4 and the phase of the rotor detected by the sound pressure sensor 4. In other words, through the above steps S3 to S5, performed is a measuring step of contactlessly measuring the sound pressure generated from vibration upon rotation of the rotor 71 performed by using the sound pressure sensor 4 capable of detecting vibration upon rotation of the rotor 71.

In step S6 of FIG. 8, a grinding-information calculation step of calculating grinding information is performed. The grinding information is information including the optimum weight amount and position for balancing the rotor 71, calculated on the basis of the signal detected in the above vibration detection step (S5). In the balancing work, the rotor 71 is ground on the basis of the grinding information, and thereby balancing of the rotor 71 is performed. The grinding information is calculated by using the vibration signal S detected by the sound pressure sensor 4, the phase of the rotor, and the effect vector. The effect vector is information indicating the relationship between the mass to be ground (unit weight) and the corresponding magnitude of vibration, which is obtained by performing a test in advance on the same product as the turbo-cartridge 7 under the balancing work.

Embodiments of the present invention were described in detail above, but the present invention is not limited thereto, and various amendments and modifications may be implemented.

DESCRIPTION OF REFERENCE NUMERALS

1 Unbalance detection device
12 Blower
13 Air supply pipe
14 Oil supply pipe
15 Coupling member
2c Compressor-side housing member
2t Turbine-side housing member
3 Support mechanism
31 Compressor-side support mechanism
32 Turbine-side support mechanism
33 Pressing device
34 Pressing rod
35 Piston device
36 Support arm
4 Vibration sensor
41 Sound picking portion
42 Sound picking surface
5 Vibration insulator
6 Biasing member
7 Turbo-cartridge
71 Rotor
72 Bearing housing
72b Bearing
72p Support-receive portion
72v Sensing surface
73 Oil supply port
8 Sensor-side vibration insulator
91 Pipe vibration insulator 92 Support-mechanism vibration insulator
93 Oil-supply-pipe vibration insulator
Wc Compressor wheel
Wt Turbine wheel
M Rotational shaft
Ew Wheel opening
Eg Air opening
Egi Inlet-side air opening
Ego Outlet-side air opening
N Unbalance detection rotation speed
V Vibration property
Vp Peak frequency
Vr Vibration property (comparative example)
Vrp Peak frequency
F1 Lower limit frequency
F2 Upper limit frequency
L Predetermined distance
P Sound pressure
S Vibration signal
v Vibration speed
a Vibration acceleration
x Vibration displacement
λ Vibration wavelength
Lp Sound pressure level

The invention claimed is:

1. An unbalance detection device for detecting unbalance of a rotor of a turbo-cartridge which includes the rotor including a turbine wheel and a compressor wheel coupled via a rotational shaft and a bearing housing accommodating a bearing which supports the rotor rotatably, the unbalance detection device comprising:
   a sound pressure sensor capable of detecting vibration upon rotation of the rotor by contactlessly measuring a sound pressure generated from vibration upon rotation of the rotor, and
   an oil supply pipe for supplying lubricant oil into the bearing housing, the oil supply pipe being configured to be connectable to and separable from an oil supply port formed on the bearing housing,
   wherein the sound pressure sensor is fixed to the oil supply pipe, and
   wherein the sound pressure sensor is configured to directly face a sensing surface, the sensing surface having a flat surface formed on the bearing housing, the sensing surface disposed such that a normal direction of an opening plane of the oil supply port and a normal direction of the sensing surface are the same.

2. The unbalance detection device according to claim 1, wherein the sound pressure sensor includes a microphone having a directional characteristic capable of picking a sound pressure from a specific direction, or the sound pressure sensor is configured to measure a sound pressure from the specific direction on the basis of respective sound pressures picked by a plurality of microphones.

3. The unbalance detection device according to claim 2, further comprising:
   a turbine-side housing member accommodating the turbine wheel;
   a compressor-side housing member accommodating the compressor wheel;
   a support mechanism configured to nip and support the turbo-cartridge from both sides by pressing at least one of the turbine-side housing member or the compressor-side housing member toward the turbo-cartridge, the support mechanism including a pressing rod and a piston device configured to push the pressing rod; and
   a vibration insulator interposed in each of a gap between the turbine-side housing member and the turbo-cartridge and a gap between the compressor-side housing member and the turbo-cartridge,
   wherein the specific direction is a direction of a position of the bearing housing.

4. The unbalance detection device according to claim 3, wherein the turbo-cartridge is supported by the support mechanism in a state where the turbo-cartridge is in contact with the vibration insulator while not being in contact with the turbine-side housing member and the compressor-side housing member.

5. The unbalance detection device according to claim 1, wherein the sound pressure sensor has a self-noise level of 50 dB or less.

6. The unbalance detection device according to claim 1, wherein the sound pressure sensor is fixed to the oil supply pipe so as to be separated by a predetermined distance from the bearing housing in a state where the oil supply pipe is connected to the oil supply port.

7. The unbalance detection device according to claim 6, wherein the predetermined distance is 0.5 to 2.0 mm.

8. The unbalance detection device according to claim 1, wherein the sound pressure sensor is fixed to the oil supply pipe via a sensor-side vibration insulator.

9. The unbalance detection device according to claim 8, wherein the sensor-side vibration insulator is a sponge.

10. An unbalance detection method for detecting unbalance of a rotor of a turbo-cartridge which includes the rotor including a turbine wheel and a compressor wheel coupled via a rotational shaft and a bearing housing accommodating a bearing which supports the rotor rotatably, the unbalance detection method comprising:
    a vibration insulator installation step of interposing a vibration insulator in each of a gap between the turbo-cartridge and a turbine-side housing member which accommodates the turbine wheel of the rotor and a gap between the turbo-cartridge and a compressor-side housing member which accommodates the compressor wheel of the rotor;
    a support step of nipping and supporting the turbo-cartridge from both sides by pressing at least one of the turbine-side housing member or the compressor-side housing member toward the turbo-cartridge via the vibration insulator; and
    a measurement step of contactlessly measuring a sound pressure generated from vibration upon rotation of the rotor by using a sound pressure sensor capable of detecting vibration upon rotation of the rotor,
    wherein the unbalance detection method further comprises a sensor fixing step of fixing the sound pressure sensor to an oil supply pipe for supplying lubricant oil into the bearing housing so that the sound pressure sensor is separated from the bearing housing by a predetermined distance, by connecting the oil supply pipe to an oil supply port formed on the bearing housing, and
    wherein the sound pressure sensor is configured to directly face a sensing surface, the sensing surface having a flat surface formed on the bearing housing, the sensing surface disposed such that a normal direction of an opening plane of the oil supply port and a normal direction of the sensing surface are the same.

11. The unbalance detection method according to claim 10, wherein the support step includes supporting the turbo-cartridge in a state where the turbo-cartridge is in contact with the vibration insulator while not being in contact with the turbine-side housing member and the compressor-side housing member.

12. The unbalance detection method according to claim 10, wherein the predetermined distance is 0.5 to 2.0 mm.

* * * * *